(12) United States Patent
Shima

(10) Patent No.: US 7,164,418 B2
(45) Date of Patent: Jan. 16, 2007

(54) METHOD, PROGRAM AND APPARATUS FOR MANAGING DISPLAY COLORS OF THREE-DIMENSIONAL VIRTUAL MODEL

(75) Inventor: Tatsuro Shima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/265,371

(22) Filed: Oct. 7, 2002

(65) Prior Publication Data
US 2003/0174140 A1 Sep. 18, 2003

(30) Foreign Application Priority Data
Mar. 18, 2002 (JP) ............... 2002-073673

(51) Int. Cl.
*G06T 15/00* (2006.01)
(52) U.S. Cl. .................... 345/419; 345/581; 345/583
(58) Field of Classification Search ............. 345/419, 345/581, 589, 591, 593, 594, 595, 597, 598, 345/600, 690, 964, FOR. 169, 172, 174, 345/212, 694; 382/162, 164, 165; 96/170, 96/180
See application file for complete search history.

(56) References Cited

U.S. PATENT DOCUMENTS 7,068,270 B1 * 6/2006 Chiu ..................... 345/420
2003/0076318 A1 * 4/2003 Shaw-Weeks ............... 345/419
2003/0112235 A1 * 6/2003 Grace ........................ 345/419

FOREIGN PATENT DOCUMENTS

| EP | 1056028 | 11/2000 |
| JP | 7-121577 | 5/1995 |
| JP | 07325910 A * | 12/1995 |
| JP | 10-49587 | 2/1998 |
| JP | 2001-38340 | 2/2001 |

* cited by examiner

*Primary Examiner*—Kee M. Tung
*Assistant Examiner*—G. F. Cunningham
(74) *Attorney, Agent, or Firm*—Staas & Halsey LLP

(57) ABSTRACT

A three-dimensional virtual model is entered that is made up of various components. An attribute definition file is then created that includes an attribute list defining different attributes for component of the three-dimensional virtual model. A rule definition file is further created that defines in advance a conversion rule for converting an attribute value into a display color for each attribute of the components. When the user selects an attribute to be color coded from the attribute list and selects a conversion rule corresponding to the selected attribute, components of the three-dimensional virtual model are displayed with different colors in conformity with the conversion rule selected.

17 Claims, 15 Drawing Sheets

FIG. 3

| | ATTRIBUTE NAME | TYPE |
|---|---|---|
| 42 | ID | Integer |
| 44 | PARENT ID | Integer |
| 46 | TITLE | String |
| 48 | VOLUME | Float |
| 50 | WEIGHT | Float |
| 52 | MATERIAL | String |
| 54 | RECYCLING POSSIBLE/IMPOSSIBLE | Bool |
| 56 | PERCENTAGE OF RECYCLING POSSIBILITY | Float |
| 58 | MATERIAL INDICATION PRESENT/ABSENT | Bool |
| 60 | SHAPE FILE NAME | String |

FIG. 4A

| ID 42 | PATENT ID 44 | TITLE 46 | VOLUME [cm³] 48 | WEIGHT [g] 50 |
|---|---|---|---|---|
| 0 | | NOTEBOOK COMPUTER | — | — |
| 1 | 0 | FRONT COVER UNIT | — | — |
| 2 | 1 | FRONT COVER | 45.97 | 45.93 |
| 3 | 1 | MECHANISM COMPONENT | — | 253.90 |
| 4 | 0 | LCD UNIT | — | — |
| 5 | 4 | LCD COVER | 10.04 | 180.0 |
| 6 | 4 | MECHANISM COMPONENT | — | 87.23 |
| 7 | 4 | SCREW | 0.02 | 0.15 |
| 8 | 4 | SCREW | 0.02 | 0.15 |
| 9 | 4 | SCREW | 0.02 | 0.15 |
| 10 | 4 | SCREW | 0.02 | 0.15 |

| MATERIAL 52 | RECYCLING POSSIBLE/ IMPOSSIBLE 54 | PERCENTAGE OF RECYCLING POSSIBILITY [g] 56 | MATERIAL INDICATION PRESENT/ ABSENT 58 |
|---|---|---|---|
| — | — | — | — |
| — | — | — | — |
| PC-ABS | ○ | 30 | ○ |
| COMPOSITE 1 | × | 0 | × |
| — | — | — | — |
| MG ALLOY | ○ | 80 | × |
| COMPOSITE 2 | × | 0 | × |
| ROLLED STEEL PLATE | ○ | 100 | × |
| ROLLED STEEL PLATE | ○ | 100 | × |
| ROLLED STEEL PLATE | ○ | 100 | × |
| ROLLED STEEL PLATE | ○ | 100 | × |

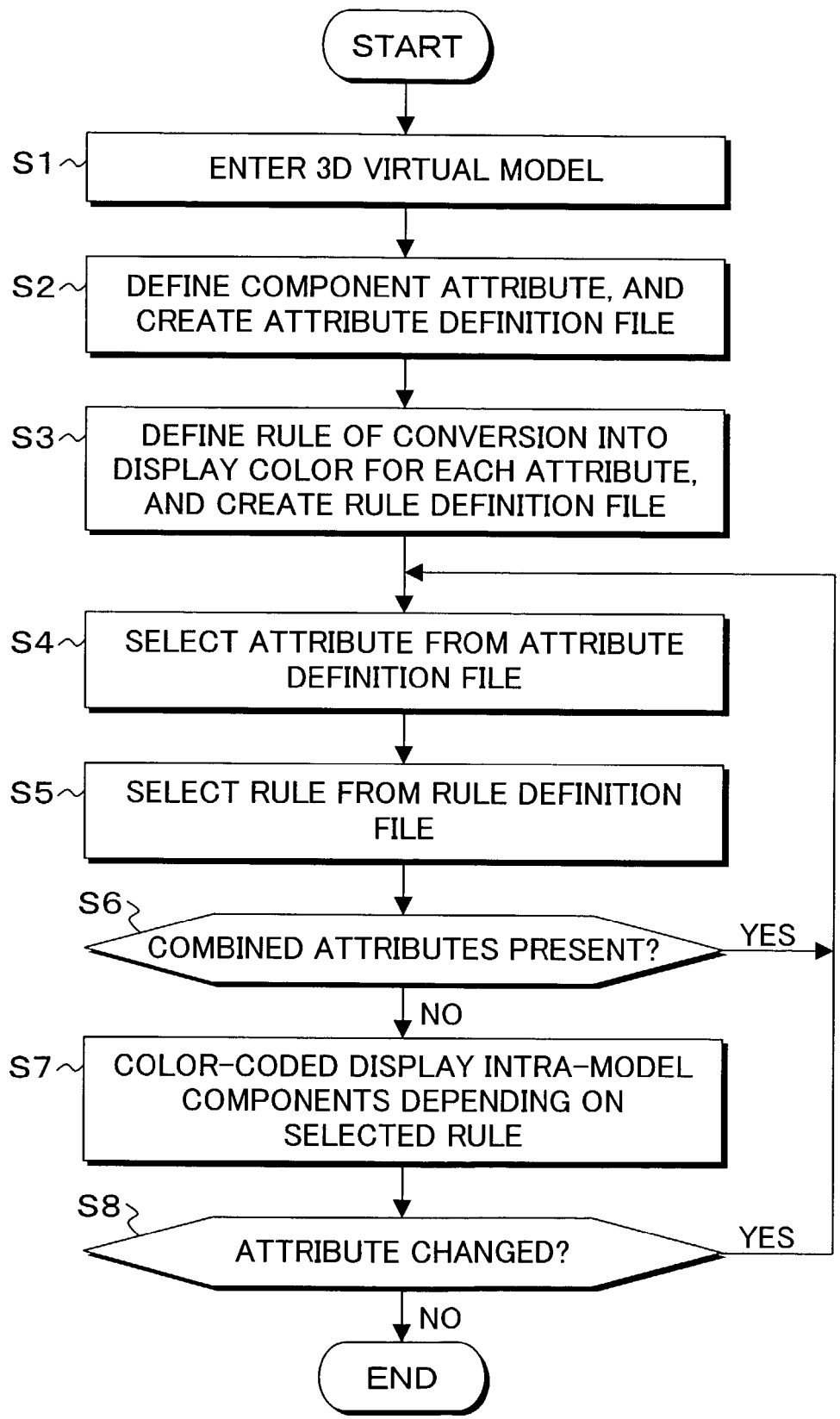

METHOD, PROGRAM AND APPARATUS FOR MANAGING DISPLAY COLORS OF THREE-DIMENSIONAL VIRTUAL MODEL

BACKGROUND OF THE INVENTION

1. Field of the Invention

The present invention relates generally to a three-dimensional virtual model display color management method, program and apparatus for displaying with different colors, depending on attributes, components making up the three-dimensional virtual model created by a three-dimensional CAD, etc., and more particularly to a management method, program and apparatus for color-code displaying components making up the three-dimensional virtual model, to assess the recyclability and disassembling properties.

2. Description of the Related Arts

Up until now, in the product development of electronic equipment and apparatuses such as computers, assessments of dynamic interference and assembling properties have been made to increase the development efficiency, using a support tool for a three-dimensional virtual model, i.e., a so-called digital mock-up, created by a three-dimensional CAD. Of late years, more and more considerations have been sought for the resource recycling and earth environment, imparting importance to the product development considering disassembling properties or environmental load reduction in life cycle. For this reason, a support tool for life cycle assessment (LCA) of components designed by the three-dimensional CAD has been provided so as to enable the amount of emission of environmental load substance such as $CO_2$ to be found out on the CAD.

To assess the recyclability and disassembling properties, the product three-dimensional virtual model is displayed with different colors on a material-to-material basis so that study can easily be made of how the product is to be disassembled and recycled.

A conventional component color display method in the three-dimensional virtual model includes giving a specific attribute to a component, one-to-one correlating a display color to the component attribute, and varying the corresponding component in the three-dimensional virtual model having actual colors so as to have a display color designated by the attribute, to provide a color-coded display. For example, notice is taken of the material attribute of the component. If the material is a synthetic resin, then the synthetic resin is correlated one-to-one with a display color so that the components made of synthetic resin are color-code displayed in the apparatus provided in the form of a three-dimensional virtual model.

The conventional three-dimensional virtual model component color-coded display could perform only a color-coded display fixed to one of various attributes such as volume, weight and material possessed by the component, due to its one-to-one correlation of a specific component attribute with the display color. Therefore, if the disassembling properties are to be assessed together with the recyclability, sufficient component color-coded display required for the assessment would not be provided, thus resulting in the assessment needing a lot of labor and time.

SUMMARY OF THE INVENTION

According to the present invention there are provided a three-dimensional model display color managing method, program and apparatus capable of various color-coded displays depending on the attributes possessed by the three-dimensional virtual model, to thereby facilitate the assessment of the recyclability, and disassembling properties, etc.

A three-dimensional virtual model display color managing method in accordance with a first aspect of the present invention comprises:

an entry step to enter a three-dimensional virtual model made up of a plurality of components;

an attribute definition step to create an attribute list which defines a plurality of different attributes for components of the three-dimensional virtual model;

a rule definition step to define a conversion rule for converting an attribute value into a display color for each attribute of the component;

an attribute selection step to select an attribute to be color coded from the attribute list;

a rule selection step to select a conversion rule corresponding to the selected attribute; and a display step to color-code display components of the three-dimensional virtual model in conformity with the selected conversion rule. This allows the user to diversely realize the component color-coded display corresponding to each attribute of components and to properly and easily assess the recyclability and disassembling properties.

Herein, the attribute definition step includes defining attribute values proper to each component, with the component attributes being classified into volume, weight, material, recycling possible/impossible, percentage of recycling possibility, material indication present/absent, etc. As used herein, the material indication present/absent refers to whether the component has an indication indicative of the material used. The rule definition step includes defining a conversion rule for individually designating a display color depending on a component attribute value. The rule definition step includes defining a conversion rule for automatically varying the gradation of a display color depending on a component attribute value. The rule definition step includes defining a conversion rule for designating a display color depending on the width by which the component attribute value is divided into a plurality of ranges. The rule definition step may include defining a plurality of different conversion rules for a single attribute. Thus, in spite of the selection of a specific attribute, a rule considered as appropriate can be selected by the judgment of the user for the component color-coded display, due to the presence of a plurality of conversion rules, thereby ensuring an effective and proper customization by the user depending on the contents of assessment. The attribute selection step includes selecting a plurality of attributes to be color-code defined from the attribute list, the rule selection step includes selecting a conversion rule for a plurality of attributes selected, and the display step includes color-code displaying components of the three-dimensional virtual model in conformity with the plurality of conversion rule selected. Due to such a capability to color-code display the components based on the combination of the plurality of attributes and conversion rules, simultaneous assessment can easily be effected for example of the recyclability and the disassembling properties which are closely associated with each other.

A second aspect of the present invention provides a program for managing display colors of a three-dimensional virtual model, the program causing a computer to execute:

an entry step to enter a three-dimensional virtual model made up of a plurality of components;

an attribute definition step to create an attribute list which defines a plurality of different attributes for components of the three-dimensional virtual model;

a rule definition step to define a conversion rule for converting an attribute value into a display color for each attribute of the component;

an attribute selection step to select an attribute to be color coded from the attribute list;

a rule selection step to select a conversion rule corresponding to the selected attribute; and a display step to color-code display components of the three-dimensional virtual model in conformity with the selected conversion rule.

A third aspect of the present invention provides an apparatus for managing display colors of a three-dimensional virtual model, the apparatus comprising an entry unit which enters a three-dimensional virtual model made up of a plurality of components;

an attribute definition unit which creates an attribute list that defines a plurality of different attributes for components of the three-dimensional virtual model;

a rule definition unit which defines a conversion rule for converting an attribute value into a display color for each attribute of the component;

an attribute selection unit which selects an attribute to be color coded from the attribute list;

a rule selection unit which selects a conversion rule corresponding to the selected attribute; and a display unit which color-code displays components of the three-dimensional virtual model in conformity with the selected conversion rule.

It is to be appreciated that the details of the program and apparatus are substantially the same as the case of the display color managing method. The above and other objects, aspects, features and advantages of the present invention will become more apparent from the following detailed description with reference to the accompanying drawings.

BRIEF DESCRIPTION OF THE DRAWINGS

FIG. 3 is an explanatory diagram of an attribute master table for use in the present invention;

FIGS. 4A and 4B are explanatory diagrams of an attribute definition file created in the present invention;

FIG. 5 is a flowchart of a display color managing process in accordance with the present invention;

DETAILED DESCRIPTION OF THE PREFERRED EMBODIMENT

Figure 1:
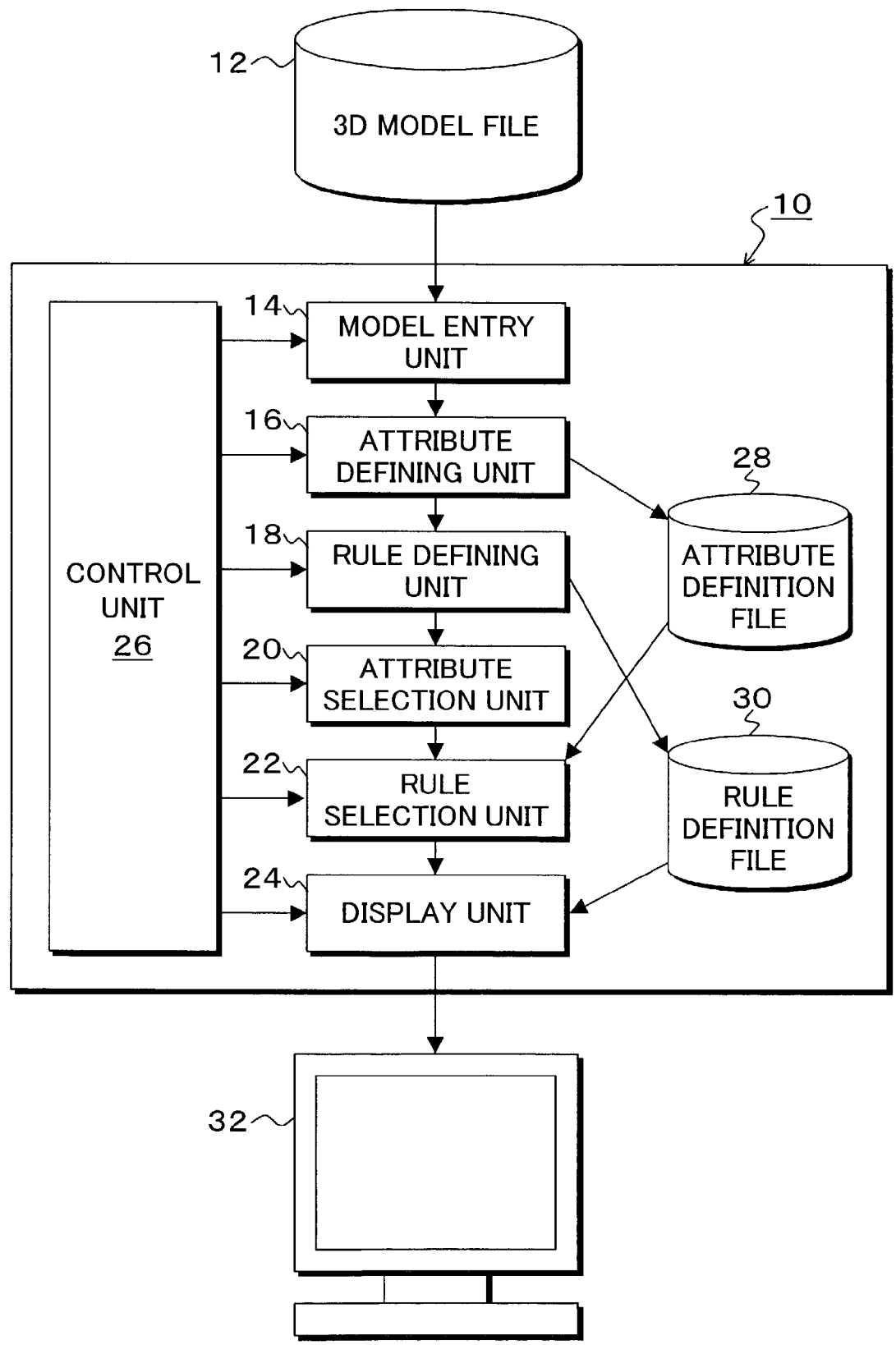
FIG. 1 is a block diagram of the functional configuration of a display color managing apparatus in accordance with the present invention.

FIG. 1 is a block diagram of the functional configuration of a three-dimensional virtual model display color managing apparatus in accordance with the present invention. The display color managing apparatus of the present invention generally designated at 10 is created as a support tool coacting with a three-dimensional CAD application programs for example. The application program prepared as the display color managing tool is installed in a computer having a three-dimensional CAD application installed therein. In such a color managing apparatus 10 of the present invention implemented by the application program acting as the display color managing tool, a three-dimensional virtual model to be processed, created by the three-dimensional CAD is entered from a three-dimensional virtual model file 12. The display color managing apparatus 10 comprises a model entry unit 14, an attribute defining unit 16, a rule defining unit 18, an attribute selection unit 20, a rule selection unit 22, a display unit 24, a control unit 26, an attribute definition file 28 and a rule definition file 30. The model entry unit 14 receives a three-dimensional virtual model built out of a plurality of prepared components which are stored in the three-dimensional virtual model file 12.

Figure 2:
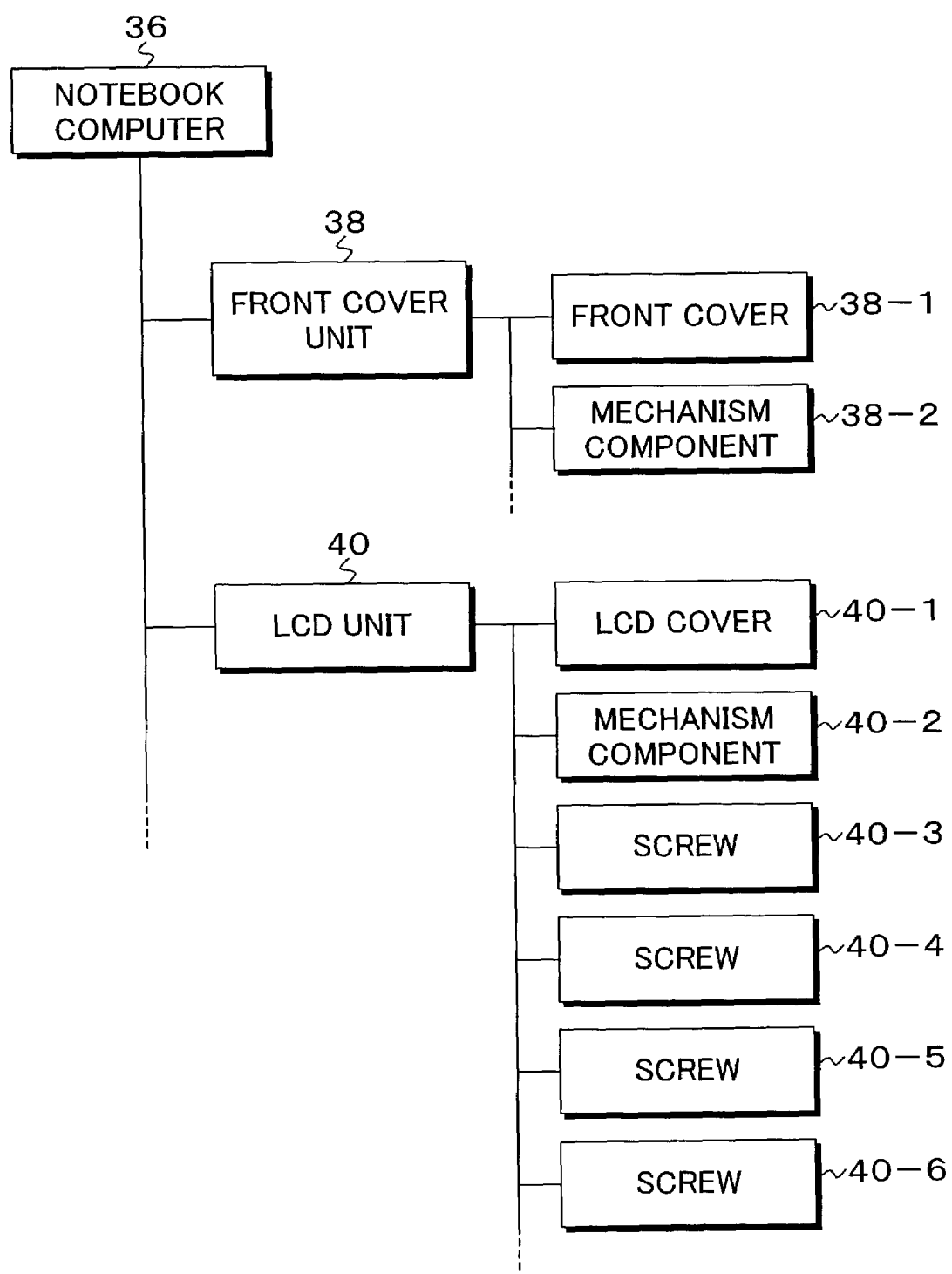
FIG. 2 is an explanatory diagram of the data structure of a three-dimensional virtual model which is color-code displayed in the present invention.

This three-dimensional virtual model is for example a personal computer of notebook type and has a tree data structure as shown in FIG. 2. This data structure includes for example a front cover unit 38, an LCD unit, etc., with the root in the form of a notebook computer 36 which is the model name. The front cover unit 38 is made up of a front cover 38-1, a mechanism component 38-2, etc. The LCD unit 40 is made up of an LCD cover 40-1, a mechanism component 40-2, screws 40-3 to 40-6, etc. The three-dimensional virtual model having such a tree data structure includes attribute information of each component such as volume, weight and material, in addition to geometric data created by the three-dimensional CAD.

Referring again to FIG. 1, the attribute defining unit 16 creates an attribute list defining a plurality of different attributes, of components which are entered through the model entry unit 14 and build up the three-dimensional virtual model, and stores the thus created list in the attribute defining file 28. The component attributes created by this attribute defining unit 16 are defined in an attribute master table 34 for example. The attribute master table 34 includes as attribute name for example ID 42, parent ID 44, title 46, volume 48, weight 50, material 52, recycling possible/impossible 54, percentage of recycling possibilities 56, material indication present/absent 58, and shape file name 60.

The attribute defining unit 16 of FIG. 1 selects attribute names necessary for the three-dimensional virtual model, which are entered from the attribute master table as shown in FIG. 3, and creates the attribute definition file 28 having an attribute list as shown in FIGS. 4A and 4B for example. The attribute definition file includes as attribute items the ID 42, the parent ID 44, the title 46, the volume 48, the weight 50, the material 52, the recycling possible/impossible 54, the percentage of recycling possibility 56 and the material indication present/absent 58, extracted from the attribute master table 34 of FIG. 3. For such attribute items, the whole apparatus, the constituent units, and constituent components are listed in the order of ID 42 correspondingly to the three-dimensional virtual model data structure of FIG. 2, with attribute values for the components being given to the volume 48, the weight 50, the material 52, the recycling possible/impossible 54, the percentage of recycling possibility 56 and the material indication present/absent 58 which are specific attributes. Of such attribute values, the values of the volume 48, weight 50 and material 52 can automatically be extracted from data contained in the three-dimensional virtual model created by the three-dimensional CAD. The value of the recycling possible/impossible 54 is also unitarily defined from the attribute value of the material 52. The value of the percentage of recycling possibility 56 can be retrieval data from the database, with the percentage of recycling possibility previously registered for each material. The material indication present/absent 58 represents whether the material surface of the object component is indicated on the actual component. For example, "front cover" in the title 46 uses a synthetic resin as the material 52, although specifically "PC-ABS" is used. Since this material surface is actually indicated on the front cover by a print seal for example, the material indication present/absent 58 is "○" in this case. The other component, e.g., LCD cover as the mechanism component is given "×" since the material indication of the component itself is not performed.

Referring again to FIG. 1, the rule defining unit 18 defines in advance a conversion rule for converting the attribute values into display colors, for each attribute of the components. The conversion rule can include the followings:
(1) A rule for individually designating the display color depending on the component attribute values;
(2) A rule for automatically varying the gradation of the display color depending on the component attribute values; and
(3) A rule for dividing the component attribute values into a plurality of ranges to designate the display color for each range.

The attribute selection unit 20 selects attributes for color coding from the attribute list stored in the attribute definition file 28. The rule selection unit 22 selects a conversion rule corresponding to the attribute selected by the attribute selection unit 20, through reference to the rule definition file 30. The display unit 24 color-code displays components of the three-dimensional virtual model on a display device 32 in conformity with the conversion rule selected by the rule selection unit 22. Herein, a single attribute may be selected of a component to be color coded of the three-dimensional virtual model by the attribute selection unit 20, or alternatively, a plurality of attributes and rules for the attributes may be selected so as to allow a color coded display of components based on the combination of a plurality of conversion rules.

FIG. 5 is a flowchart of the procedure of the display color managing apparatus 10 of FIG. 1 in accordance with the present invention. This flowchart provides a program structure for display color management in accordance with the present invention. In step S1, a three-dimensional virtual model to be displayed created by the three-dimensional CAD for example is entered from the three-dimensional virtual model file 12. Then, the attributes are defined of components making up the three-dimensional virtual model entered in step S2, to create the attribute definition file forming the attribute list as in FIG. 4 for example. Then, in step S3, on an attribute-to-attribute basis, the rule definition file 30 is created that defines the rule of conversion into the display color. Since the conversion rule corresponds to the component attributes, it is normal to fixedly define in advance the conversion rule for each attribute type. Then in step S4, the user selects attributes to be color coded from the attribute definition file. This selection may be made of a single attribute or a plurality of attributes. Then in step S5, a rule used for color-coded display of the attributes after selection is selected from the rule definition file 30. If there is a further combination of other attributes in step S6, then the procedure goes back to step S4 to select the next attribute, and a rule therefor is selected in step S5. If there is no more combination of attributes, then the procedure goes to step S7 where the color-coded display of the components within the model is performed in conformity with the selected rule for the selected attributes. Then in step S8, a check is made of whether the attribute has been changed or not, and if there is a demand for the change of attribute, then the procedure goes again to step S4 to repeat the processing based on new selection of an attribute and a rule therefor.

Figure 6:
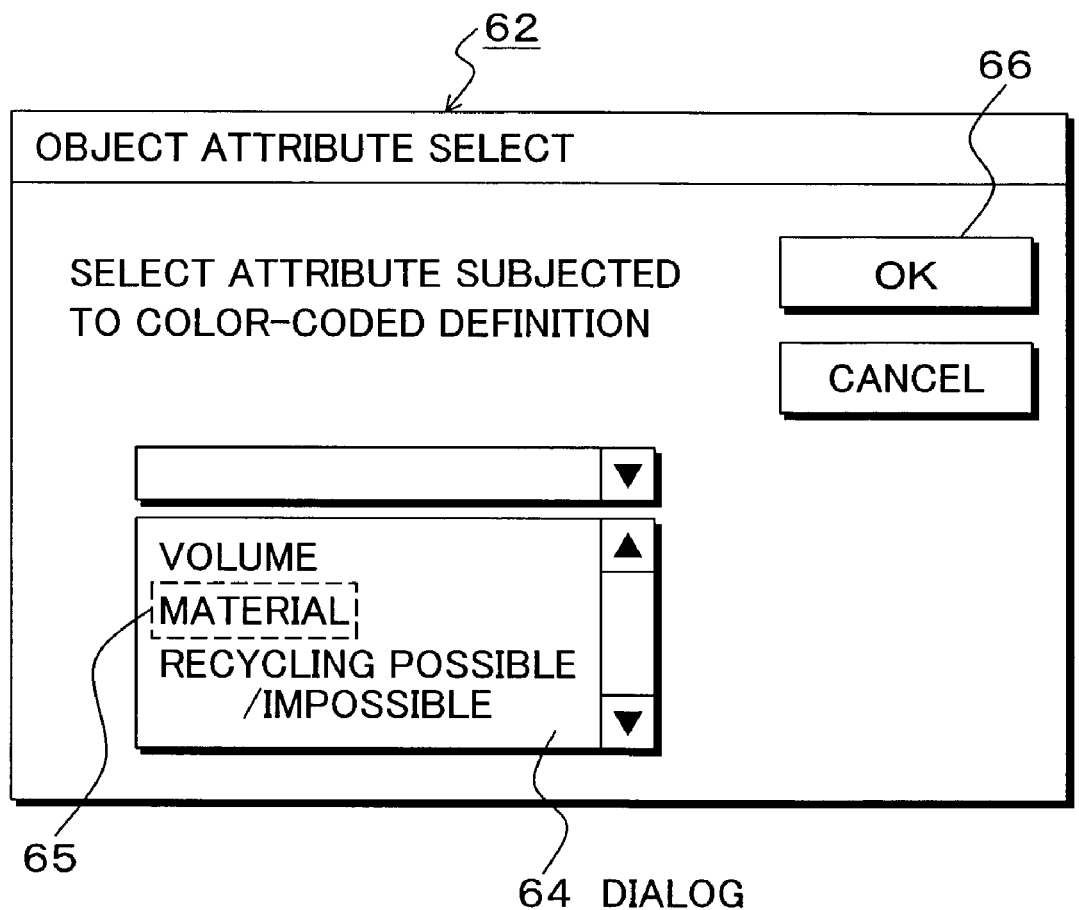
FIG. 6 is an explanatory diagram of an object attribute selection screen for use in the attribute selection of the user.

FIG. 6 is an explanatory diagram of an object attribute selection screen 62 effected by the user on the attribute selection unit 20 in the display color management of the present invention. The object attribute selection screen 62 is provided with a dialog 64 for selecting the attribute to be color-code defined. This dialog 64 is opened to select the material 65 for example as the attribute for the color-code display and to press an OK button 66.

Figure 7:
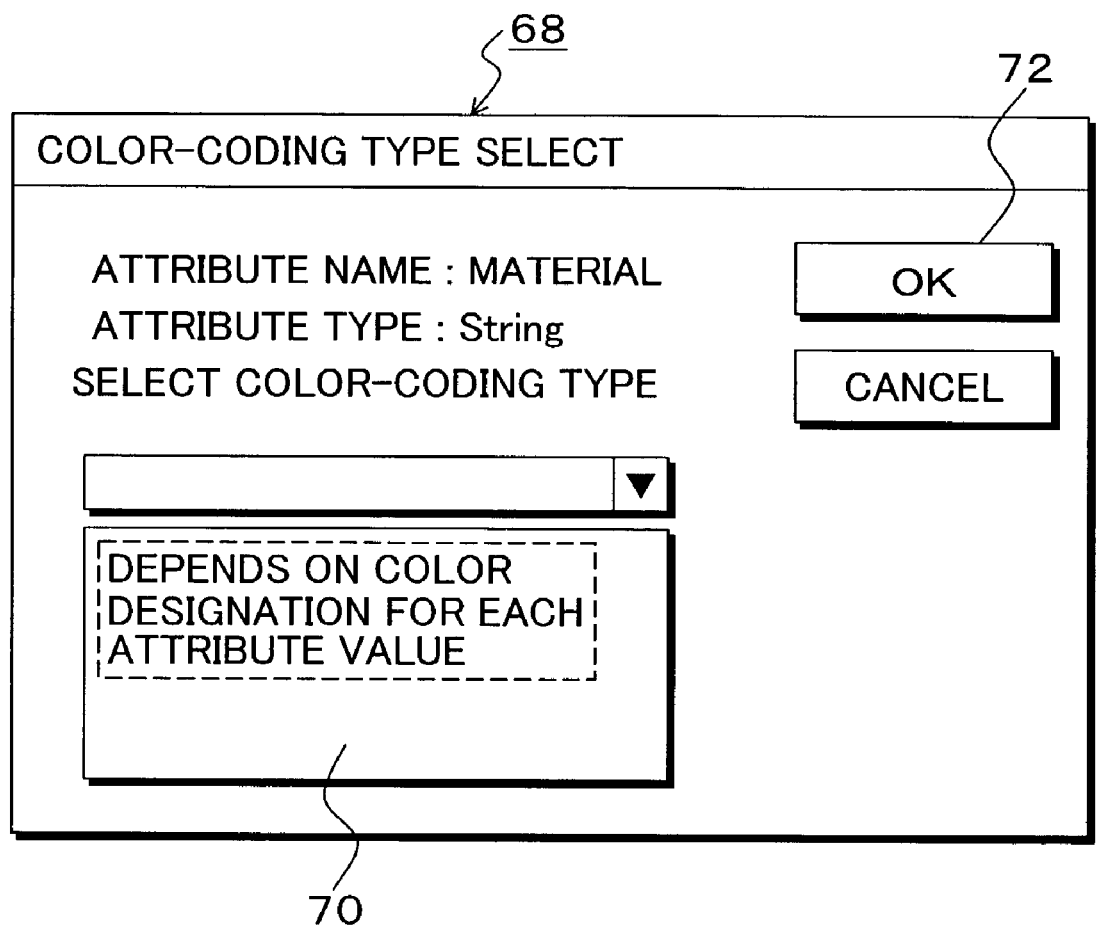
FIG. 7 is an explanatory diagram of a conversion rule selection screen for use in the selection of a conversion rule of the user.

After the attribute selection by the object attribute selection screen 62, switching is made to a conversion rule selection screen 68 of FIG. 7. This conversion rule selection screen 68 provides as the conversion rule selection conditions a display of message "Select color-coding type". When the dialog 70 is opened, conversion rules adapted to the attribute name "material" in this case are displayed for example. Since the conversion rule for the material attribute in this case is considered to be "by the color designation for each attribute value", that conversion rule is selected and the OK button 72 is pressed.

Figure 8:
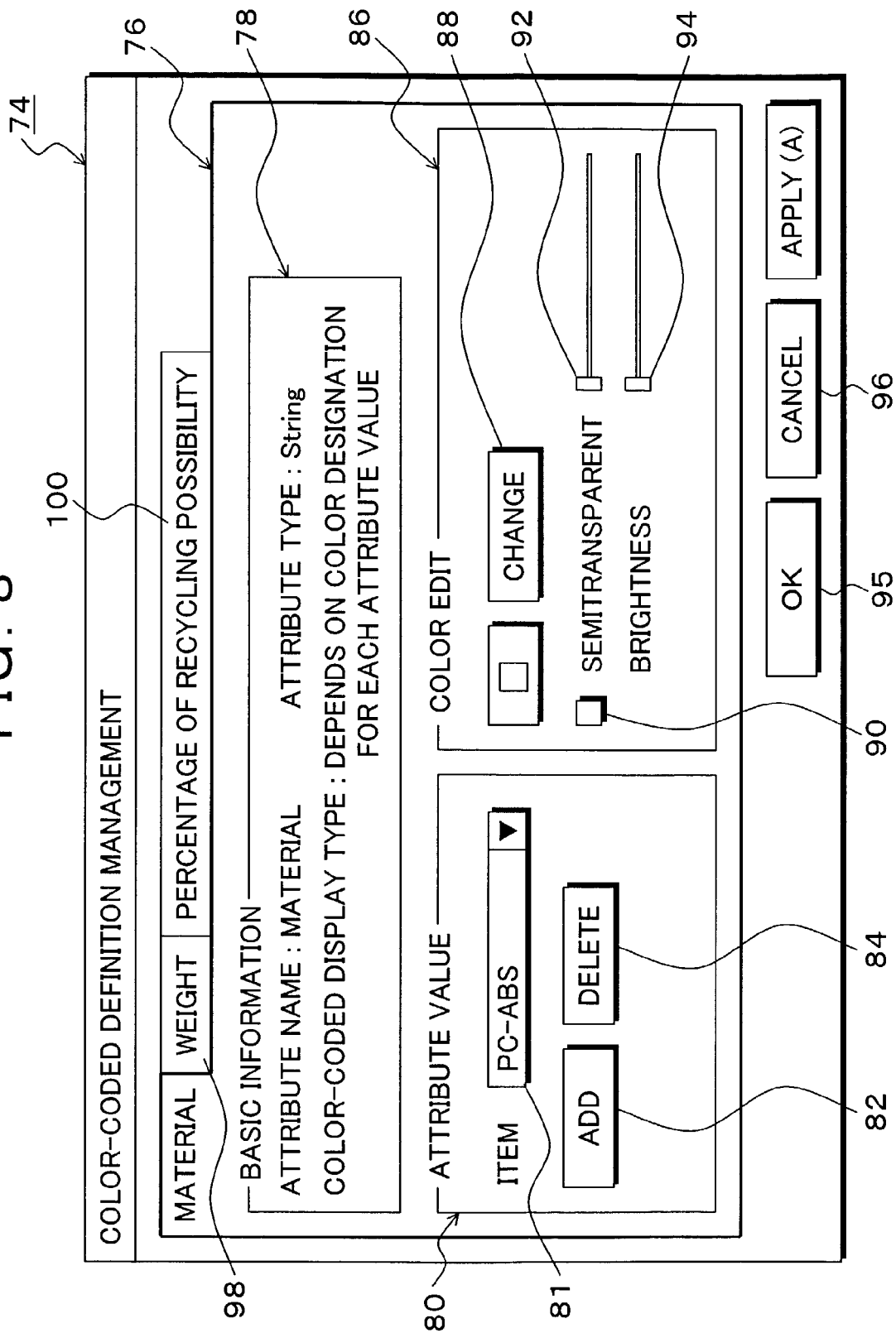
FIG. 8 is an explanatory diagram of a parameter setting screen for use in the designation of an attribute value and a color.

After the completion of selection of the conversion rule through the conversion rule selection screen 68 of FIG. 7, switching is made to a parameter setting screen 74 of FIG. 8. The parameter setting screen 74 includes a parameter setting screen 76 for material, a parameter setting screen 98 for weight, and a parameter setting screen 100 for percentage of recycling possibility. In this case, the parameter setting screen 76 for material is opened correspondingly to the material which is the attribute selected in FIG. 6. On the parameter setting screen 76 for material there appears basic information 78 which bears thereon the attribute name "material" in current selection and "depends on color designation for each attribute value" which is the color-coding display type as the conversion rule. An attribute value column 80 below includes a dialog 81 for the attribute value selection item, which in its active state, indicates "PC-ABS" which is a material name registered in the attribute definition file 28 of FIG. 4. The material name indicated in this dialog 81 can be changed to another material name or deleted by opening the dialog. For these purposes, this screen is provided with ADD button 82 and DELETE button 84. On the right side of the attribute value column 80 is located a color edit column 86, which allows setting of the display color for the component of "PC-ABS" which is the material selected as the attribute. A change button 88 is used to select any display color. By clicking a check box 90, it is possible to adjust the degree of semitransparency by use of a slide button 92 and to adjust the degree of brightness by use of a slide button 94. After the completion of necessary setting, an OK button 95 is operated. If cancellation of the setting is desired, then the CANCEL button 96 is pressed.

Figure 9:
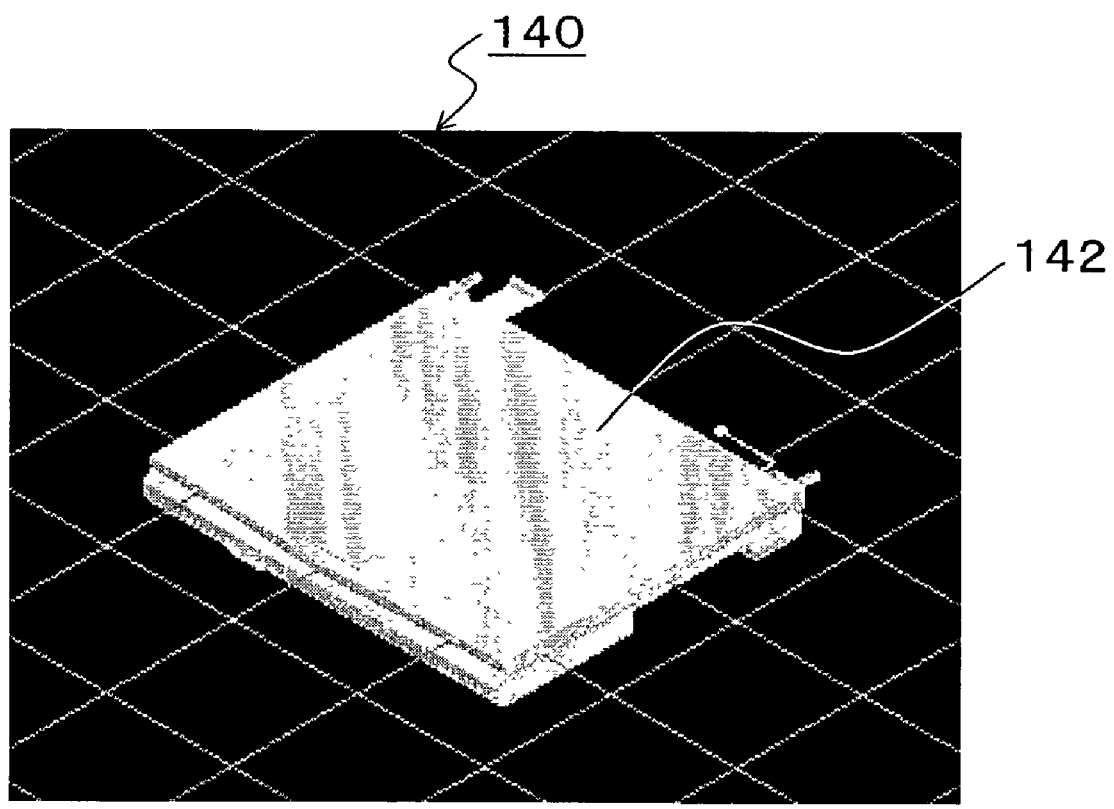
FIG. 9 is an explanatory diagram of a model display screen on which no component color-coded display is performed.

FIG. 9 shows a specific example of the three-dimensional virtual model displayed by the display device 32 in the display color management in accordance with the present invention. On a display screen 140 there appears a notebook computer 142 created as a three-dimensional virtual model. In this case, an original three-dimensional virtual model is displayed instead of the color-coded display by the attribute selection of the procedure. If the selection of object attribute, selection of conversion rule and the parameter setting as in FIGS. 7 and 8 are made on the display screen 140 of the original notebook computer 142, then it becomes possible to color-code display components of the notebook computer in conformity with the selected attribute and rule as in FIG. 10 for example.

Figure 10:
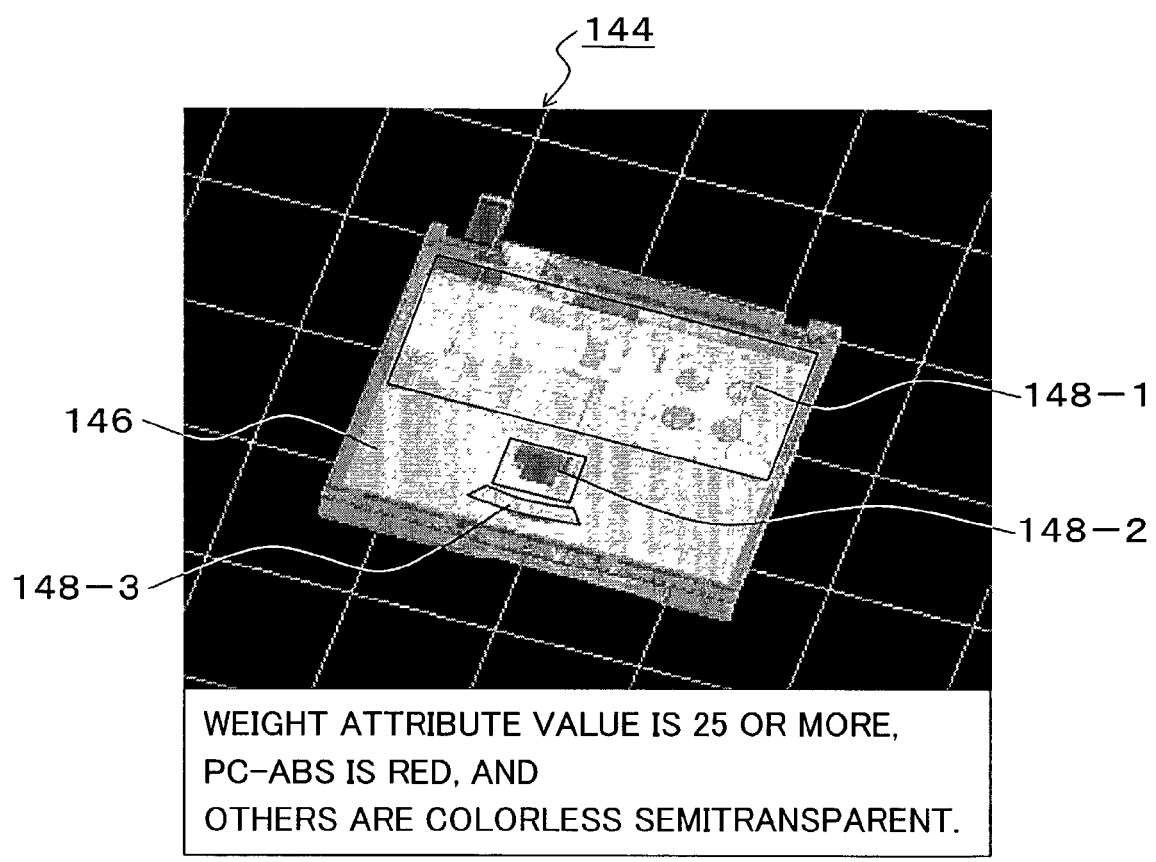
FIG. 10 is an explanatory diagram of a component color-coded display screen of combined weight attribute and material attribute.

A display screen 144 of FIG. 10 shows a color-coded display of the notebook computer in case of performing the attribute selection and rule selection of the components having the weight attribute value of 25 or more, where the material "PC-ABS" is red with the others being colorless semitransparent. In this color-coded display, a portion made of PC-ABS of the notebook computer is a red display area 146 and the other portions are displayed as colorless semi-transparent areas 148-1, 148-2, 148-3, etc.

Figure 11:
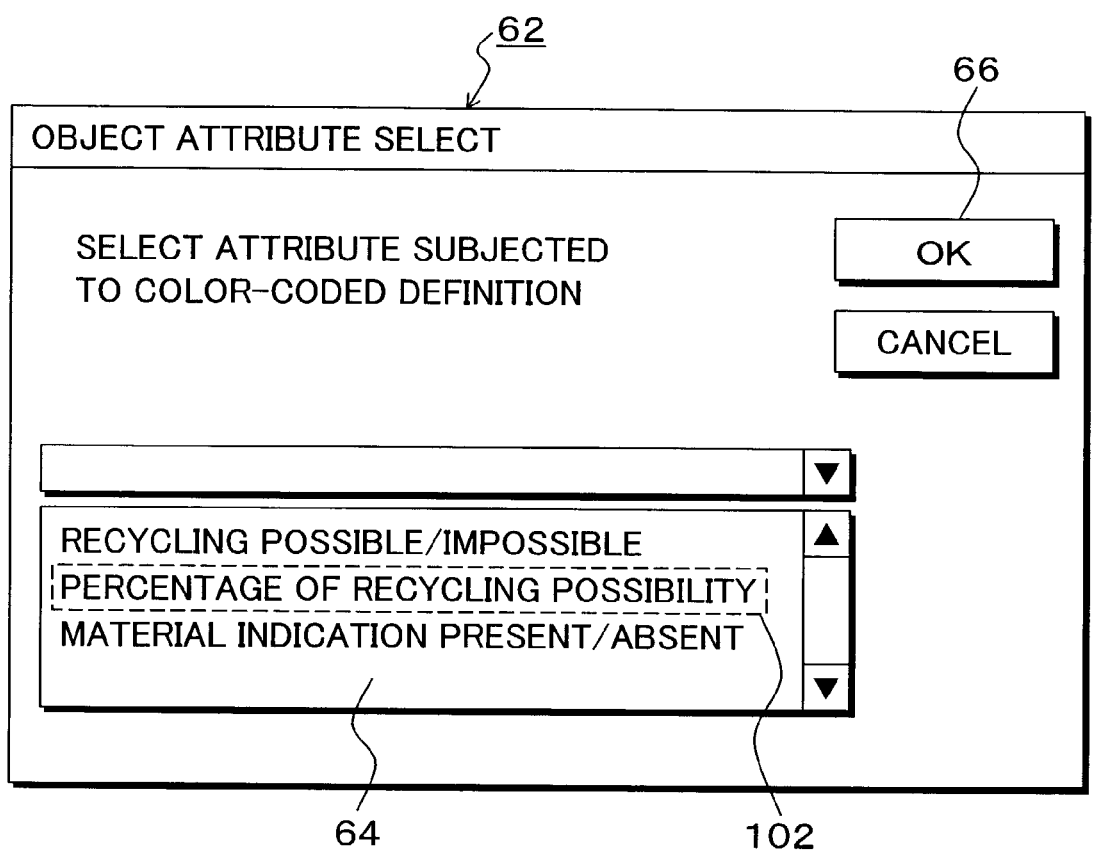
FIG. 11 is an explanatory diagram of the object attribute selection screen selecting a recycling possibility attribute.

FIG. 11 shows another state of selection of the object attribute selection screen 62. It is assumed in this case that the user selects the percentage of recycling possibility 102 from the dialog 64 and presses the OK button 66. This object attribute selection allows a switching to the conversion rule selection screen 68 of FIG. 12.

Figure 12:
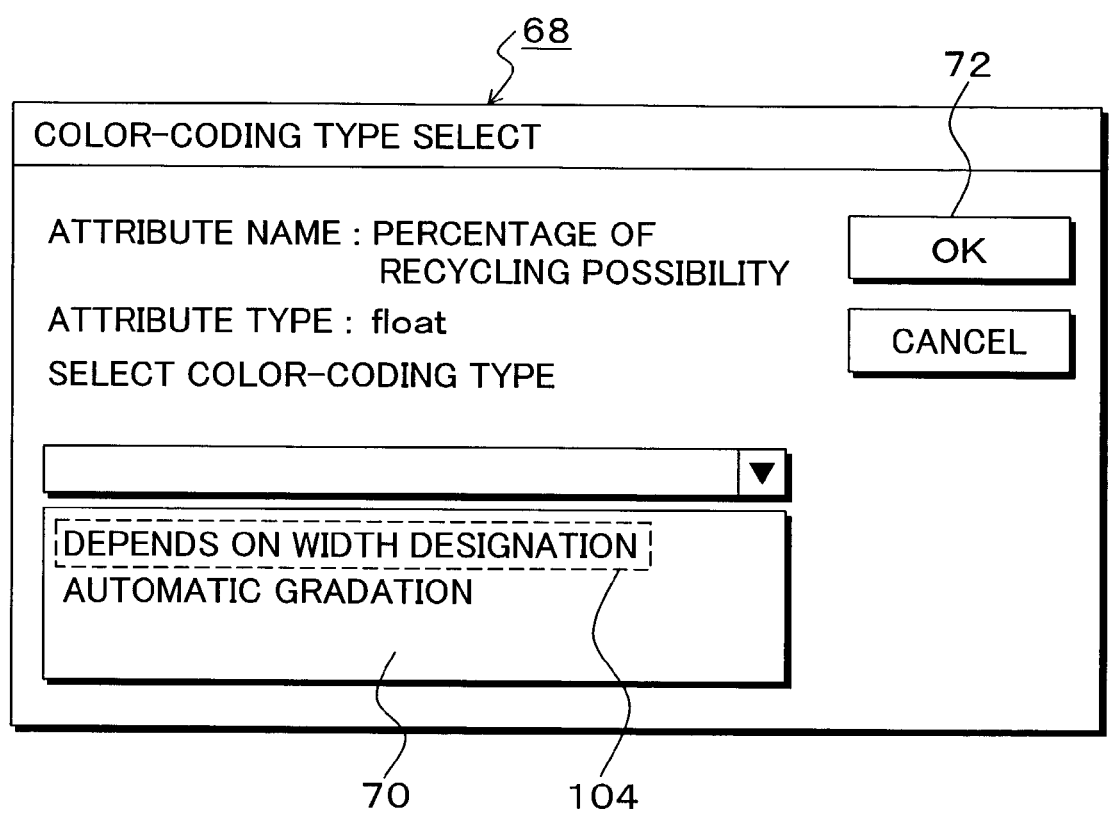
FIG. 12 is an explanatory diagram of a conversion rule selection screen selecting a conversion rule by the width designation.

When a dialog 70 is opened on the conversion rule selection screen 68 of FIG. 12, there appear "depends on width designation" and "automatic gradation". Assume in this case that "depends on width designation" is selected as the conversion rule 104 and that an OK button 72 is pressed. The selection of this conversion rule allows a switching to a parameter setting screen 74 of FIG. 13. In this case, the percentage of recycling possibility is selected as the selection attribute, and therefore a parameter setting screen 100 for percentage of recycling possibility is open. The parameter setting screen 100 for percentage of recycling possibility is provided with a width designation column 108 below a basic information 106. This width designation column 108 is used to set the number of division of width, i.e., the number of ranges, and the lower limit 112 and the upper limit 114 in percentage of each width, for the percentage of recycling possibility having the value of 0 to 100%. If the percentage of recycling possibility is desired to be divided into three ranges, "1", "2" and "3" are selected with the dialog 110, while simultaneously percentage is set for the values of the respective widths by use of the lower limit 112 and the upper limit 114. For example, the lower limit 0% and the upper limit 0% are set for the width designation "1", the lower limit 0% and the upper limit 60% are set for the width designation "2", and the lower limit 60% and the upper limit 100% are set for the width designation "3". Correspondingly to such width designation in the width designation column 108, the display colors at the width designations "1", "2" and "3" are designated using a change button 122 in a color edit column 120 on the right side of the width designation column 108. A check box 124 is operated so that the degree of semitransparency and the brightness can be adjusted by slide buttons 126 and 128, respectively. After the completion of the parameter setting, an OK button 95 is pressed.

Figure 13:
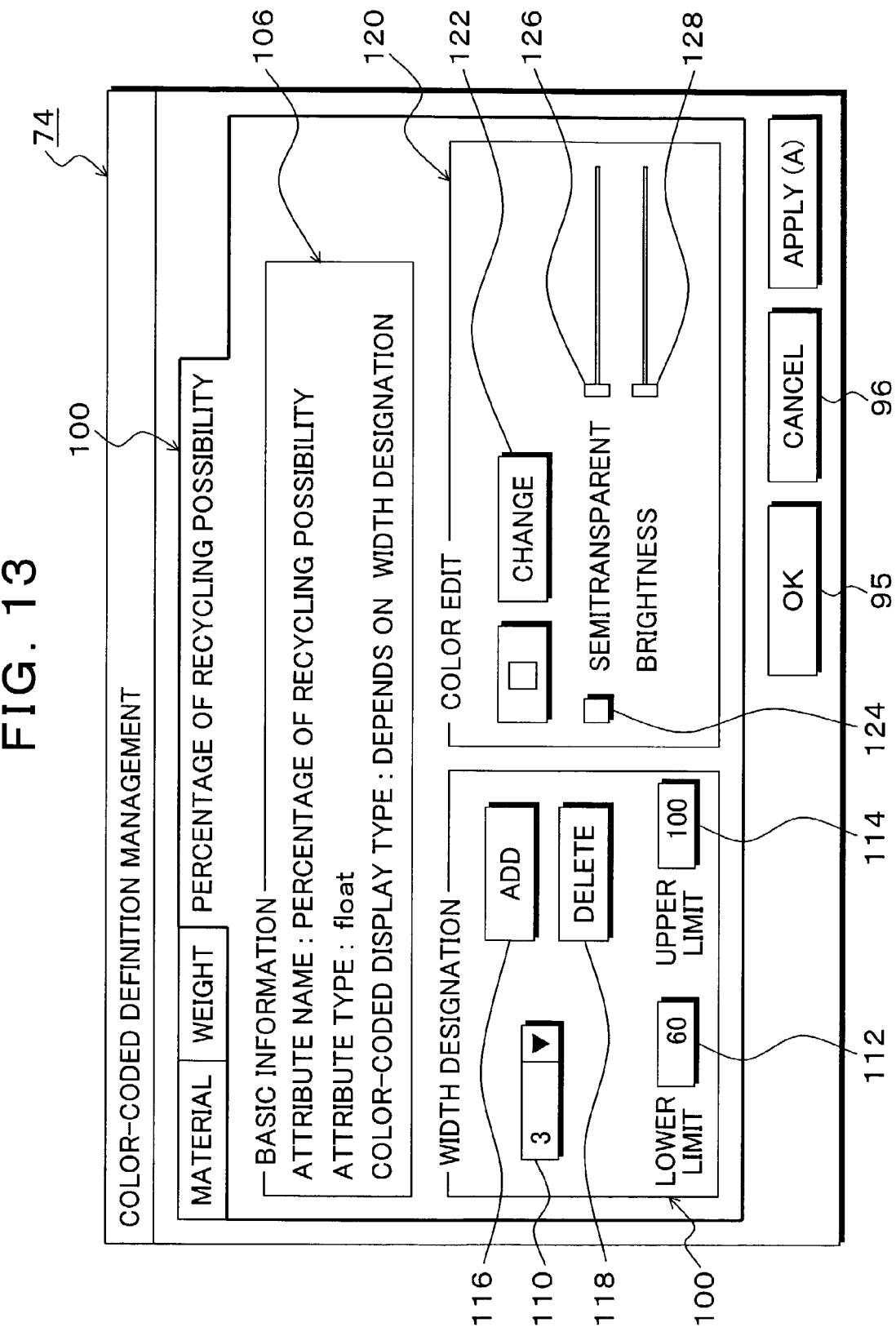
FIG. 13 is an explanatory diagram of a parameter setting screen of the recycling possibility attribute.
Figure 14:
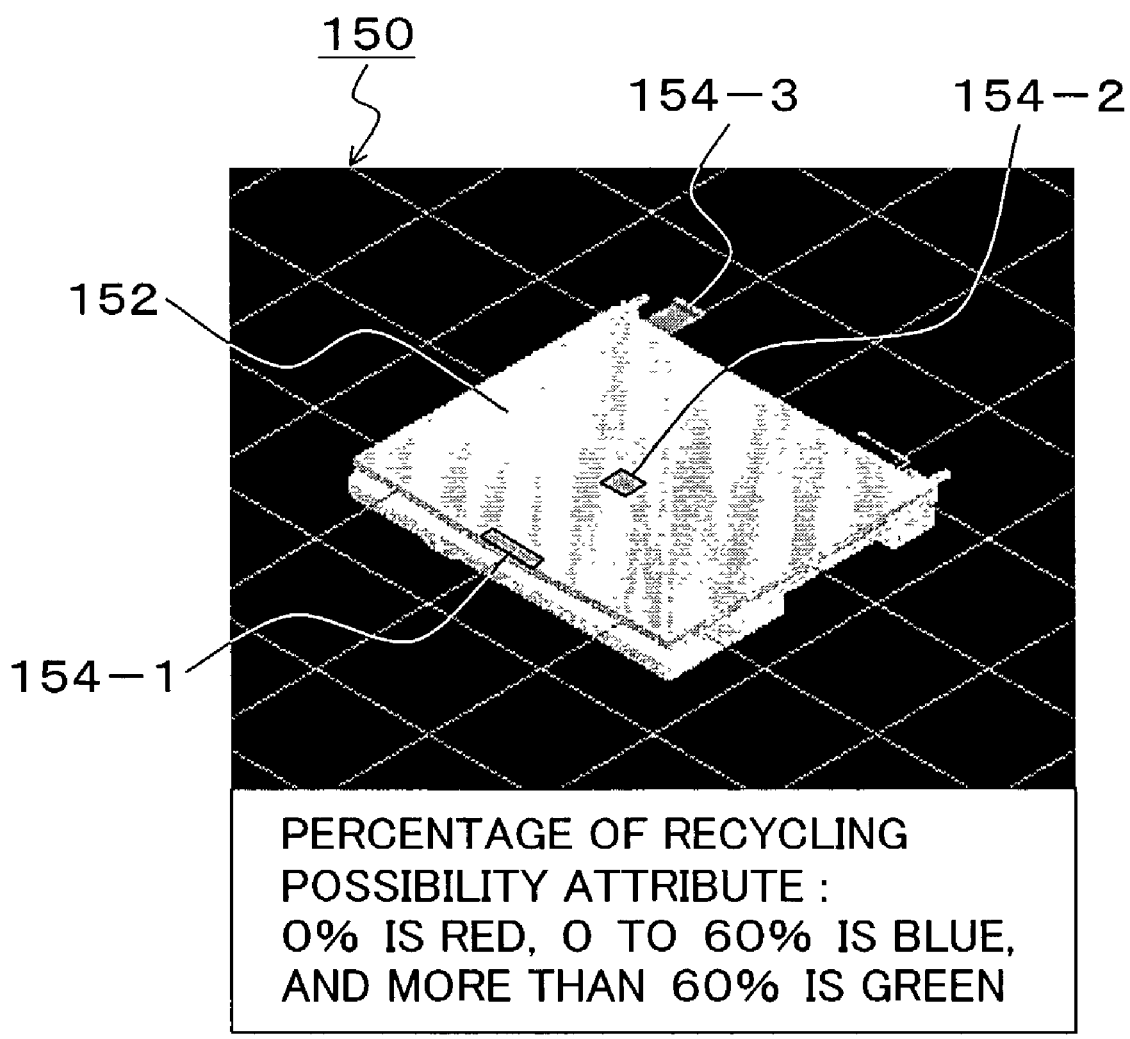
FIG. 14 is an explanatory diagram of a color-coded display screen based on the recycling possibility attribute.

FIG. 14 shows a color-coded display screen obtained by selecting the percentage of recycling possibility as the color-coded display attribute and "depends on the width designation" as the conversion rule through the attribute conversion rule and the parameter designation of FIGS. 11 and 12, and by setting, as the parameter setting of FIG. 13 based thereon, red for the percentage of recycling possibility of 0%, blue for over 0% to less than 60%, and green for 60% or more. Thus, on a display screen 150, a green displayed area 152 represents the percentage of recycling possibility of 60% or more, and red display areas 154-1, 154-2 and 154-3 represent the percentage of recycling possibility of 0%. This color-coded display allows the user to easily grasp the status of the percentage of recycling possibility for each constituent element of the notebook computer.

It is natural that the three-dimensional virtual model color-coded display in accordance with the present invention enables color-coded display of components based on the combination of a single or plural attributes to be performed in an appropriate manner. This is achieved by establishing required conversion rules through the selection of proper component attributes from the attribute definition file 28 having the contents of FIG. 4, in addition to the specific attribute selection, conversion rule selection and parameter setting of FIGS. 6 to 11. The user can determine how to color-code display the components, while freely making the attribute selection, conversion rule selection and parameter setting, with the result that it is possible for the user to make prompt and proper customization for specific assessment.

As set forth hereinabove, the present invention enables possible color-coded display corresponding to each attribute of components to easily be realized through the attribute selection, conversion rule selection and parameter setting by the user, for the three-dimensional virtual model made up of a plurality of components. For example, the color-coded display of the components enables assessments for recyclability or disassembling property which may indispensable to life cycle assessment (LCA) for example to properly and easily be realized. Due to capability of the user to make color-coded display of components through proper selection of an attribute from a plurality of attributes of each component and through selection of a proper rule from a plurality of conversion rules defined for the selected attribute, it is possible to make effective and proper customization for the component color-coded display by the user depending on the contents of assessment and to obtain an extremely high applicability.

Although the above embodiment has been directed by way of example to the display color management to be utilized as a three-dimensional CAD support tool, it could also be a dedicated tool having input in the form of a three-dimensional virtual model, instead of the support tool. It could also be constructed as a support tool provided by the APS server in internets, etc. It will be appreciated that the present invention encompasses any variants without impairing its objects and advantages and that the present invention is not restricted by the numerical values indicated in the above embodiment.

What is claimed is:

1. A method for managing display colors of a three-dimensional virtual solid industrial product model, said method comprising:

entering a three-dimensional virtual solid industrial product model including a plurality of prepared three-dimensional virtual solid industrial component models into a computer;

creating an attribute list which defines a plurality of different attributes for the prepared three-dimensional virtual solid industrial component models of said three-dimensional virtual solid industrial product model, wherein said plurality of different attributes include one or more physical attributes inherent in physical components corresponding to said prepared three-dimensional virtual solid industrial component models;

defining a conversion rule for converting an attribute value into a display color for each attribute of said prepared three-dimensional virtual solid industrial component models;

selecting an attribute to be color coded from said attribute list;

selecting a conversion rule corresponding to said selected attribute; and color-code displaying the three-dimensional virtual solid industrial component models of said three-dimensional virtual solid industrial product model in conformity with said selected conversion rule.

2. The method according to claim 1, wherein the creating the attribute list includes defining attribute values proper to each prepared three-dimensional virtual solid industrial component model, with said attributes of the prepared three-dimensional virtual solid industrial component models including volume, weight, material, and an indication of presence or absence of a material.

3. The method according to claim 1, further comprising:

defining a conversion rule for individually designating a display color depending on attribute values of the prepared three-dimensional virtual solid industrial component models.

4. The method according to claim 1, further comprising:

defining a conversion rule for automatically varying the gradation of a display color depending on attribute values of the prepared three-dimensional virtual solid industrial component models.

5. The method according to claim 1, further comprising:

defining a conversion rule for designating a display color depending on the width by which said attribute values of the prepared three-dimensional virtual solid industrial component models are each divided into a plurality of ranges.

6. The method according to claim 1, further comprising:

defining a plurality of different conversion rules for a single attribute.

7. The method according to claim 1, further comprising:

selecting a plurality of attributes to be color-code defined from said attribute list;

selecting a conversion rule for a plurality of attributes selected; and color-code displaying the prepared three-dimensional virtual component industrial models of said three-dimensional virtual solid industrial product model in conformity with the selected conversion rule.

8. A computer-readable medium encoded with a computer program for managing display colors of a three-dimensional virtual solid industrial product model, said computer program causing a computer to execute:

receiving a three-dimensional virtual solid industrial product model including a plurality of prepared three-dimensional virtual solid industrial component models into the computer;

creating an attribute list which defines a plurality of different attributes for the prepared three-dimensional virtual solid industrial component models of said three-dimensional virtual solid industrial product model, wherein said plurality of different attributes include one or more physical attributes inherent in physical components corresponding to said prepared three-dimensional virtual solid industrial component models;

defining a conversion rule for converting an attribute value into a display color for each attribute of the prepared three-dimensional virtual solid industrial component models;

selecting an attribute to be color coded from said attribute list;

selecting a conversion rule corresponding to said selected attribute; and color-code displaying the prepared three-dimensional virtual solid industrial component models of said three-dimensional virtual solid industrial product model in conformity with said selected conversion rule.

9. The program according to claim 8, wherein the creating the attribute list includes defining attribute values proper to each prepared three-dimensional virtual solid industrial component model, with said attributes of the prepared three-dimensional virtual solid industrial component models including volume, weight, material, and an indication of presence or absence of a material.

10. The program according to claim 8, further comprising:

defining a conversion rule for individually designating a display color depending on attribute values of the prepared three-dimensional virtual solid industrial component models.

11. The program according to claim 8, further comprising:

defining a conversion rule for automatically varying the gradation of a display color depending on attribute values of the prepared three-dimensional virtual solid industrial component models.

12. The program according to claim 8, further comprising:

defining a conversion rule for designating a display color depending on the width by which said attribute values of the prepared three-dimensional virtual solid industrial component models are each divided into a plurality of ranges.

13. The program according to claim 8, further comprising:

defining a plurality of different conversion rules for a single attribute.

14. The method according to claim 8, further comprising:

selecting a plurality of attributes to be color-code defined from said attribute list;

selecting a conversion rule for a plurality of attributes selected; and color-code displaying the prepared three-dimensional virtual solid industrial component models of said three-dimensional virtual solid industrial product model in conformity with the selected conversion rule.

15. An apparatus for managing display colors of a three-dimensional virtual product model, said apparatus comprising:

an entry unit which enters a three-dimensional virtual product model including a plurality of three-dimensional virtual component models;

an attribute definition unit which creates an attribute list that defines a plurality of different attributes including a possibility of recycling and a percentage of the possibility of recycling for the three-dimensional virtual component models of said three-dimensional virtual product model;

a rule definition unit which defines a conversion rule for converting an attribute value into a display color for each attribute of said three-dimensional virtual component models;

an attribute selection unit which selects an attribute to be color coded from said attribute list;

a rule selection unit which selects a conversion rule corresponding to said selected attribute; and a display unit which color-code displays the three-dimensional virtual component models of said three-dimensional virtual product model in conformity with said selected conversion rule.

16. A method for managing display colors of a three-dimensional virtual solid industrial product model, the method comprising:

entering a three-dimensional virtual solid industrial product model including a plurality of prepared three-dimensional virtual solid industrial component models into a computer, the three-dimensional virtual solid industrial component models having a plurality of attributes, said plurality of attributes including one or more physical attributes inherent in physical components corresponding to said prepared three-dimensional virtual solid industrial component models;

selecting a conversion rule corresponding to at least one of the attributes, the conversion rule correlating the at least one of the attributes with a display color; and displaying the prepared three-dimensional virtual solid industrial component models of the three-dimensional virtual solid industrial product model based on the selected conversion rule.

17. The method according to claim 16, wherein the conversion rule is selected by a user.

* * * * *

UNITED STATES PATENT AND TRADEMARK OFFICE
CERTIFICATE OF CORRECTION

PATENT NO. : 7,164,418 B2 Page 1 of 1
APPLICATION NO. : 10/265371
DATED : January 16, 2007
INVENTOR(S) : Tatsuro Shima It is certified that error appears in the above-identified patent and that said Letters Patent is hereby corrected as shown below:

Title Page, Column 2 item (57) (Abstract), Line 4, change "component" to --components--.

Signed and Sealed this

Eighth Day of April, 2008

JON W. DUDAS
*Director of the United States Patent and Trademark Office*